May 31, 1927.  
R. C. PIERCE  
SPIRAL FORMING MACHINE  
Filed Feb. 4, 1922  
1,630,716  
3 Sheets-Sheet 2
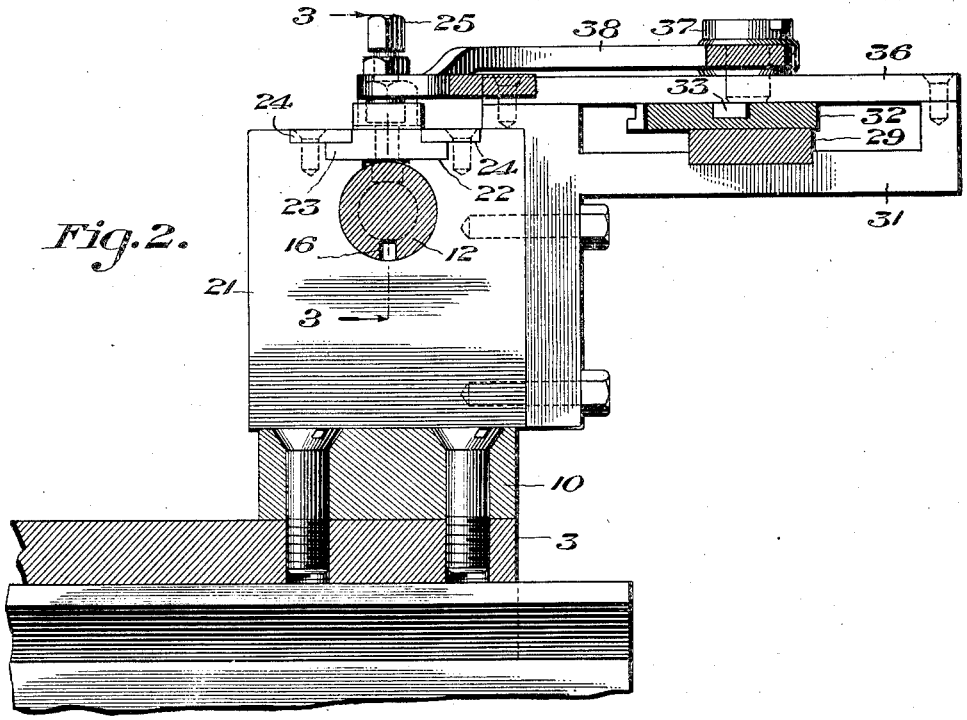
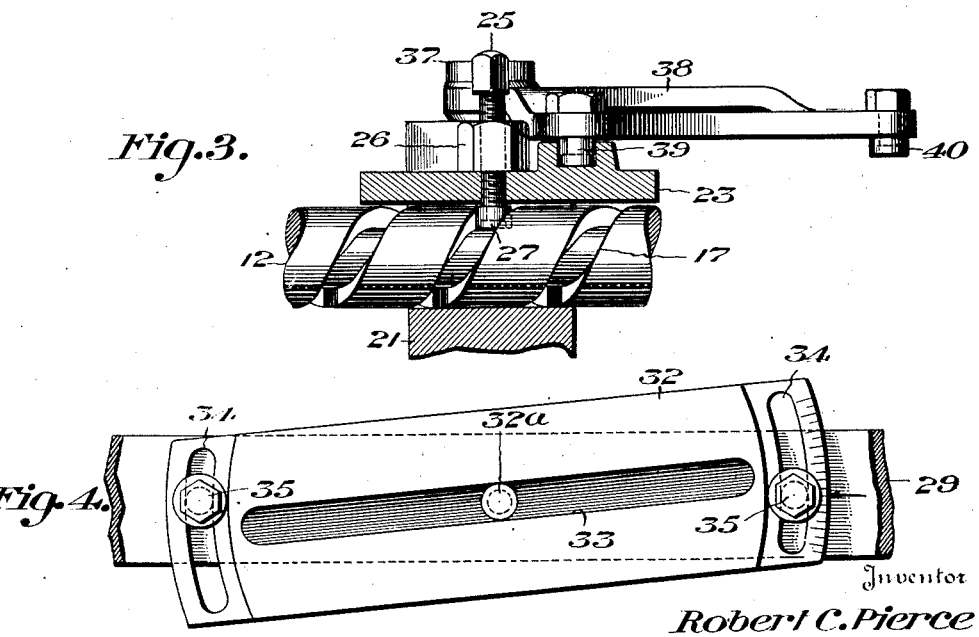
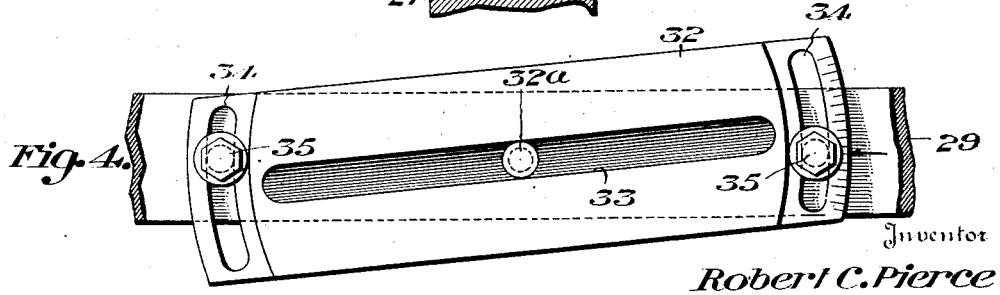
Inventor  
Robert C. Pierce  
by  
Attorney

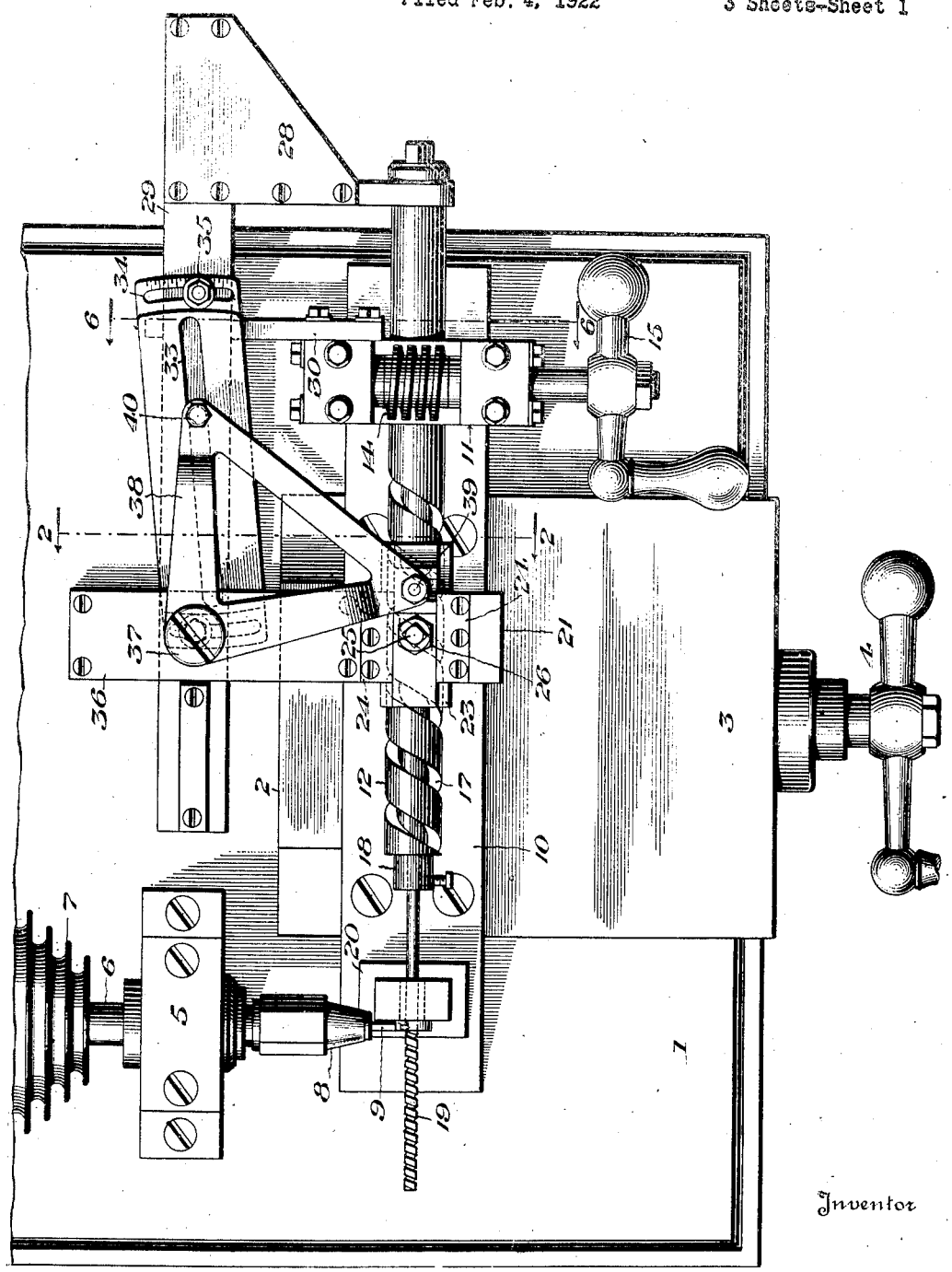

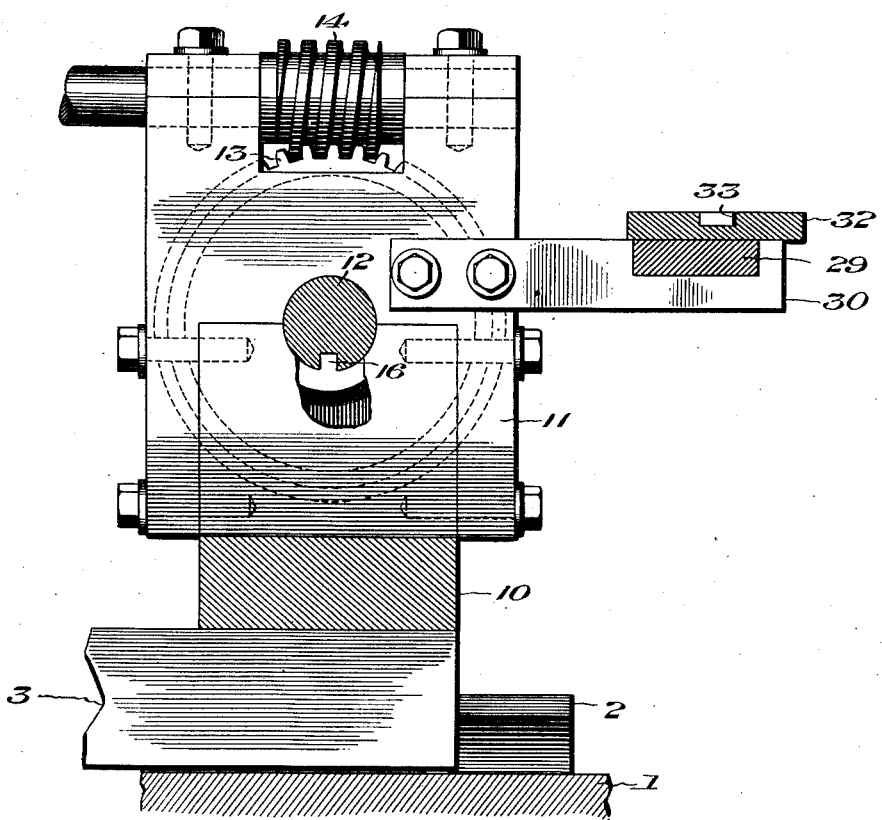
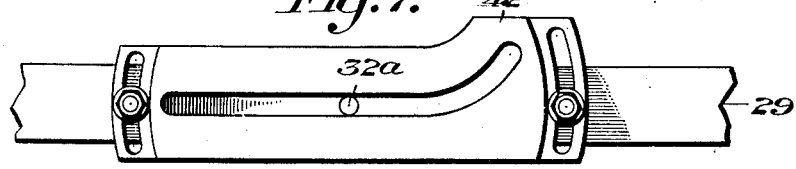
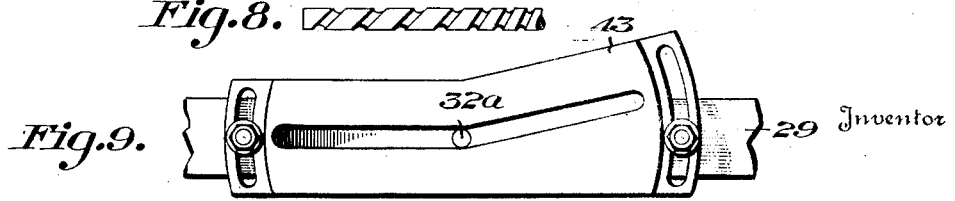

Patented May 31, 1927.

1,630,716

UNITED STATES PATENT OFFICE.

ROBERT C. PIERCE, OF AKRON, OHIO, ASSIGNOR TO JOHN R. GAMMETER, OF AKRON, OHIO.

SPIRAL-FORMING MACHINE.

Application filed February 4, 1922. Serial No. 534,020.

This invention relates to a machine or apparatus adapted for describing or cutting spiral lines or grooves, particularly on rods or bars. The purpose of the invention is to enable spirals of varying pitch or character to be cut with great accuracy and by a simple adjustment.

This invention is especially adapted for use in the manufacture of spiral dies or quills which are used for many purposes as for example, in spiralling of wire. In the manufacture from a spirally formed wire, of endless rings or grommets, which are used in the reinforcement of the beads of pneumatic tires, it is necessary, in order to construct beads of different circumferences, that a large variety of pitches of spirals be easily obtainable so that the length of spiral in the wire may be evenly divisible with the total circumference of the bead and in the manufacture of this article it is very beneficial to have a device available by which spirals of any pitch or character may be readily obtained.

My invention is designed to supply this want although it is not necessarily restricted to such use, as other uses and relationships may appear in which the apparatus of the invention would be useful. While this work may be done by the use of a large number of patterns or master spirals, the configuration of which is reproduced in the finished work, the furnishing of a large number of patterns or master spirals is avoided by my invention, it being possible to cut or describe a large number of different spirals with the use of a single or master spiral.

In this application there is shown and described one form of my invention, it being understood that the showing is for the purpose of enabling one skilled in the art to practice the invention, and is not to be taken as limiting the invention to the exact form shown and described, as modifications and alterations may be made within the scope of the invention and of the claims attached hereto.

In the drawings:

Fig. 1 is a plan view of a machine embodying my invention.

Fig. 2 is a vertical section thereof on the line 2—2 of Fig. 1.

Fig. 3 is a section along the feed screw or master spiral.

Fig. 4 is a view of the guide plate.

Fig. 5 is a view showing the form of spiral cut with the guide plate of Fig. 4.

Fig. 6 is a section on the line 6—6 of Fig. 1.

Figs. 7 and 9 are modifications of the guide plate shown in Fig. 4.

Figs. 8 and 10 are views of the spirals cut with the parts shown in Figs. 7 and 9.

The machine of the invention comprises a cutting or scribing tool, usually a milling cutter and a work holding device which supports the work and rotates and advances it longitudinally past the cutter so as to form the spiral. The work holder or mandrel is formed as a master spiral or screw and means are provided for adjusting the mandrel so as to obtain minute variations in the pitch of the spiral.

Having given this brief synopsis of the machine, it will be seen from the drawings that the present embodiment of the invention comprises a base plate 1, having guides 2, on which is slidably mounted the carriage 3, which is fed transversely of the base plate by means of a screw (not shown) operated by a handle 4. At a suitable point at the side of the carriage 3 on the base plate, is secured a bracket 5, which supports a rotary shaft 6 driven by pulleys 7, the end of the shaft toward the carriage carrying a chuck 8 in which is secured the cutter 9 or other suitable instrument to cut or scribe the spiral in the work.

To the top of the carriage 3 is secured a long plate or bar 10, on the end of which remote from the cutter is secured a housing 11 in which is rotatably and slidably mounted the work holding mandrel 12, the mandrel being rotated by a worm gear 13, driven by a worm 14 in the upper part of the housing, which is provided with an operating handle 15. The mandrel 12 and the gear are connected for rotation, but to permit longitudinal travel of the mandrel by a keyway or feather 16.

The forward end of the mandrel is provided with a spiral groove 17 which is the master spiral or pattern, and in its forward end with a work holding chuck 18, which supports the work piece, a rod 19, so that it passes within the path of the cutter. The work is steadied by a guide or centering device 20, attached to the end of the bar 10, adjacent the tool.

The portion of the mandrel having the spiral 17 thereon is guided in the upper side of the block 21 attached to the bar 10, and above the mandrel the block is cut away to provide a slideway 22 in which is slidably supported a plate 23 retained in the slideway by gibs 24. Adjustably secured in the plate 23 by a lock nut 26, is a screw-threaded bolt 25 the lower end of which carries a roller 27 which is received in the spiral groove 17.

Now it will be seen that as the mandrel is rotated by the worm gear 13, the pin 27 will cause the mandrel to move lengthwise and if the pilot pin or tracker 25 is stationary the cutter will reproduce the spiral 17 on the work. If however, the pilot pin or tracker is shifted to the right or to the left, during the rotation of the mandrel, the spiral which is cut will be slightly longer or shorter in pitch than the spiral of the pattern. If, therefore, means are provided for shifting the pin at a given rate proportionate to the rate of rotation of the mandrel, minute deviations in the spiral can be produced. If the movement is to the left of Fig. 1 the length or pitch of the spiral will be increased, if the movement is to the right it will be decreased.

In order to shift the pin 25 to obtain the results desired, the following mechanism has been devised as one means, other forms being possible.

Loosely mounted on the end of the mandrel, remote from the work holding chuck, is a bracket 28 to which is attached a bar 29, paralleling the mandrel 12. This bar moves with the mandrel and is guided in a bracket 30 attached to the housing 11, and in a bracket 31, attached to the block 21. On the upper face of the bar 29 is pivoted a guide plate 32, at 32ª, provided with a longitudinal slot or groove 33, the plate being formed with arcuate slots 34 through which pass adjusting and holding screws 35 so that the plate 32 may be set at any desired angle to the bar 29, bringing the slot 33 so that it is oblique to the line of the mandrel.

To the bracket 31 is attached a plate 36 spanning the guide plate 32, on which plate is located a pivot 37. On the pivot 37 is rotatably mounted an angular lever 38, one extremity of which is pivoted to the slide 23 as at 39, and the other extremity of which carries a roller 40, travelling in the slot 33.

It will be seen that if the guide plate 32 is set so that the slot is at an angle as shown in Figs. 1 and 4, as the mandrel rotates it moves longitudinally by engagement of the spiral 17 with the pilot pin, and at the same time the bar 29 and guide plate 32 move forwardly in parallelism. The slot 33 will rock the angular lever 38 slowly, pulling the pilot pin backwardly which retards the advance and causes the spiral produced by the tool to be slightly shorter than the master or pattern spiral 17. The plate 32 may be graduated as shown so that any accurate or minute adjustment of the spiral may be obtained, from an exact reproduction thereof, if the slot is fixed parallel to the mandrel, or greater or less as the plate is swung in either direction.

Fig. 5 shows the spiral produced by the adjustment shown in Fig. 4. If a spiral is desired over a whole or a portion of the work piece which is of gradually decreasing or increasing pitch, a plate such as shown at 42 in Fig. 7 may be provided, whereupon the spiral will be as shown in Fig. 8. If two separate spirals of different pitches are desired a plate such as shown at 43 in Fig. 9 may be provided, whereupon the spiral will be as shown in Fig. 10.

It will be seen that the essential feature of my invention is the adjustment of the mandrel during rotation by acting upon the spiral so that the longitudinal travel is retarded or accelerated. In the present embodiment of my invention this is done by moving the element which tracks the master spiral during its rotation and this may be done by moving the pin longitudinally, or by any other suitable means.

Claims:

1. In a device for producing spirals, a work holder and a tool, means for rotating the work holder, and moving it longitudinally with respect to the tool, comprising a spiral on the work holder, a tracker engaging with said spiral and means controlled by movement of the work holder for moving the tracker during rotation of the work holder.

2. In a device for producing spirals, a mandrel, a work holder, on said mandrel, a master spiral on said mandrel, a pin engaging said spiral to cause longitudinal movement of the mandrel and means for moving the pin in timed relation to the rotation of the mandrel.

3. In a device for producing spirals of varying pitch, a master spiral, a work holder rotated with the master spiral, means for rotating the master spiral, a relatively stationary member for engaging the master spiral and causing it to move axially during rotation and means controlled by movement of the work holder to shift the member during rotation of the spiral.

4. In a device for producing spirals of varying pitch, a mandrel, a spiral pattern on said mandrel, a work holder connected to the mandrel, means for rotating the mandrel, a member for engaging the pattern to cause the mandrel to move axially during its rotation, and means controlled by movement of the work holder to shift said member.

5. In an apparatus for producing spirals of varying pitch, a mandrel, a spiral pattern on said mandrel, a work holder rotated together with said mandrel, means for rotating said parts, a tracker pin engaging the spiral pattern, whereby the mandrel is moved axially during its rotation, a mounting for said tracker pin slidable relative to the mandrel and a device controlled by movement of the work holder for moving said mounting.

6. In an apparatus for producing spirals of varying pitch, a mandrel, a spiral pattern on said mandrel, a work holder rotated together with said mandrel, means for rotating said parts, a tracker pin engaging the spiral pattern whereby the mandrel is moved axially during its rotation, a mounting for said tracker pin slidable relative to the mandrel and a device for moving said mounting, operating in definite timed relation to the speed of rotation of the mandrel.

7. In an apparatus of the character set forth, a work holder, means to move said work holder in rotation, and axially at the same time and adjustable means controlled by axial movement of the work holder for retarding or accelerating the axial movement relative to its normal movement without affecting the rotary movement.

8. In an apparatus of the character set forth, a work holder, and a tool, a screw feed for the work holder to advance the work across the tool and a device controlled by the advancing movement of the work holder and co-operating with the screw feed to retard or accelerate the advance of the work without affecting the rotation thereof.

9. In an apparatus of the character set forth, a work holder and a tool, a screw feed for the work holder to advance the work across the tool and a device co-operating with the screw feed to retard or accelerate the advance of the work without affecting the rotation thereof, said device operating in definite timed relation to the speed of rotation.

10. In an apparatus of the character set forth, a rotary and longitudinally movable mandrel, a work holder associated with said mandrel, a spiral pattern on said mandrel, a tracker pin engaging said pattern, a slide for supporting said tracker pin, a lever connected with said slide and device for moving said lever operated by the movement of said mandrel.

11. In an apparatus of the character set forth, a rotary and longitudinally movable mandrel, a work holder carried by said mandrel, a spiral pattern on said mandrel, a tracker pin engaging said pattern, a slide for supporting said tracker pin, a pivoted member connected with said slide, a guide plate engaging said pivoted member and means to move said guide plate.

12. In an apparatus of the character set forth, a rotary and longitudinally movable mandrel, a work holder carried by said mandrel, a spiral pattern on said mandrel, a slide movable axially of said mandrel, a tracker pin on the slide engaging the pattern, a lever device connected to said slide and means to operate said lever actuated by the movement of the mandrel.

13. In an apparatus of the character set forth, a rotary and longitudinally movable mandrel, a work holder carried by said mandrel, a spiral pattern on said mandrel a slide movable axially of said mandrel, a tracker pin on the slide engaging the patterns, a lever device connected to said slide, and means moving with the mandrel to operate the lever.

14. In an apparatus of the character set forth a rotary and longitudinally movable mandrel, a work holder carried by said mandrel, a spiral pattern on said mandrel, a slide movable axially of said mandrel, a tracker pin on the slide engaging the pattern, a pivoted lever connected to said slide, a guide plate movable longitudinally with the mandrel, and a groove on said guide plate to engage the end of the lever remote from the slide.

15. In an apparatus of the character set forth, a rotary and longitudinally movable mandrel, a work holder carried by said mandrel, a spiral pattern on said mandrel, a slide movable axially of said mandrel, a tracker pin on the slide engaging the pattern, a pivoted lever connected to said slide, a guide plate movable longitudinally with the mandrel, a groove on said guide plate to engage the end of the lever remote from the slide, and means to adjust the slide to vary the position of the groove.

ROBERT C. PIERCE.